United States Patent Office 3,358,439
Patented Dec. 19, 1967

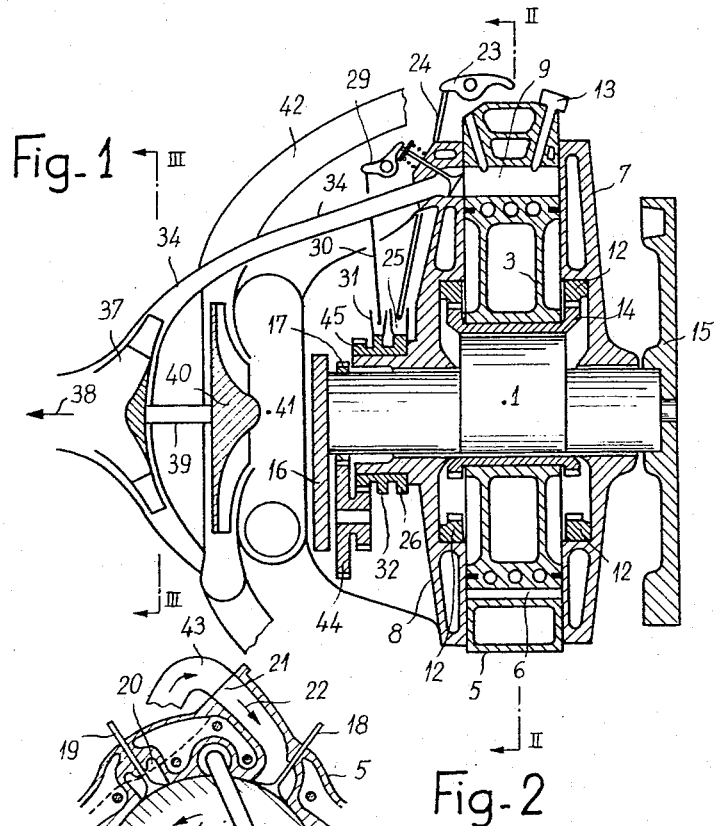
Fig. 1
Fig. 2
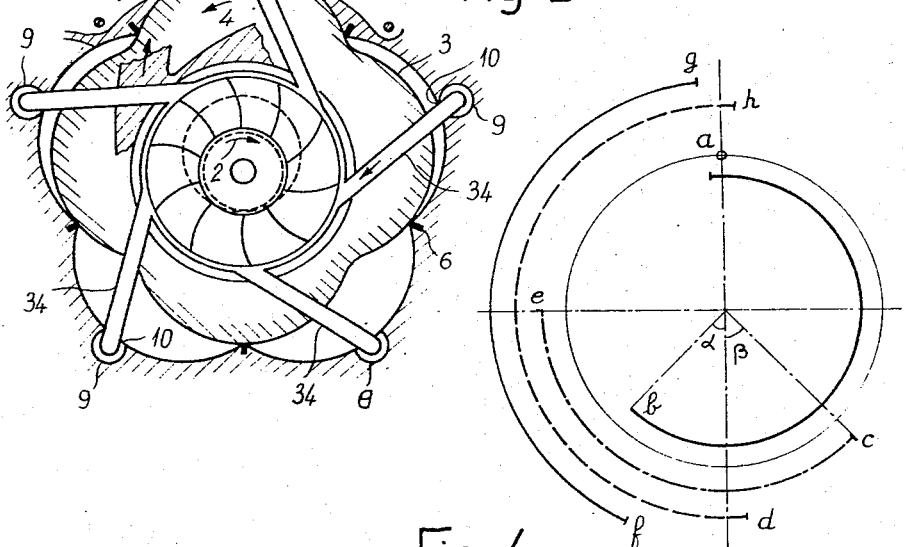
Fig. 4
Inventor
Gaëtan De Coye De Castelet
By Stevens, Davis, Miller & Mosher
Attorneys

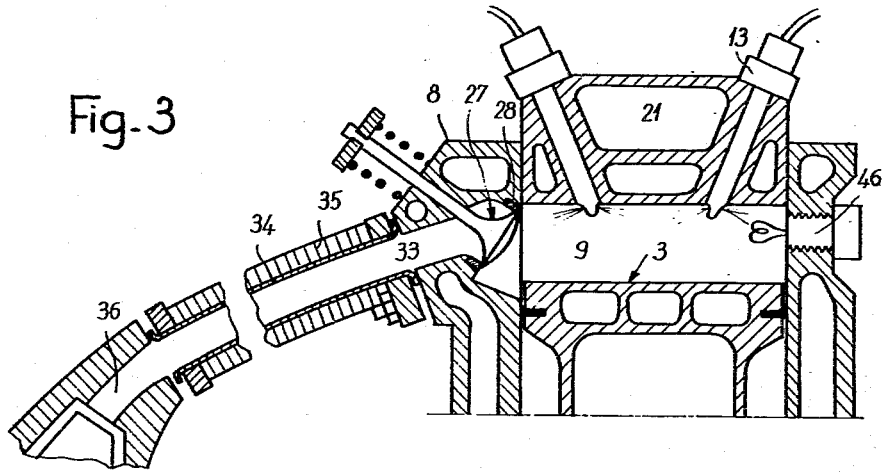
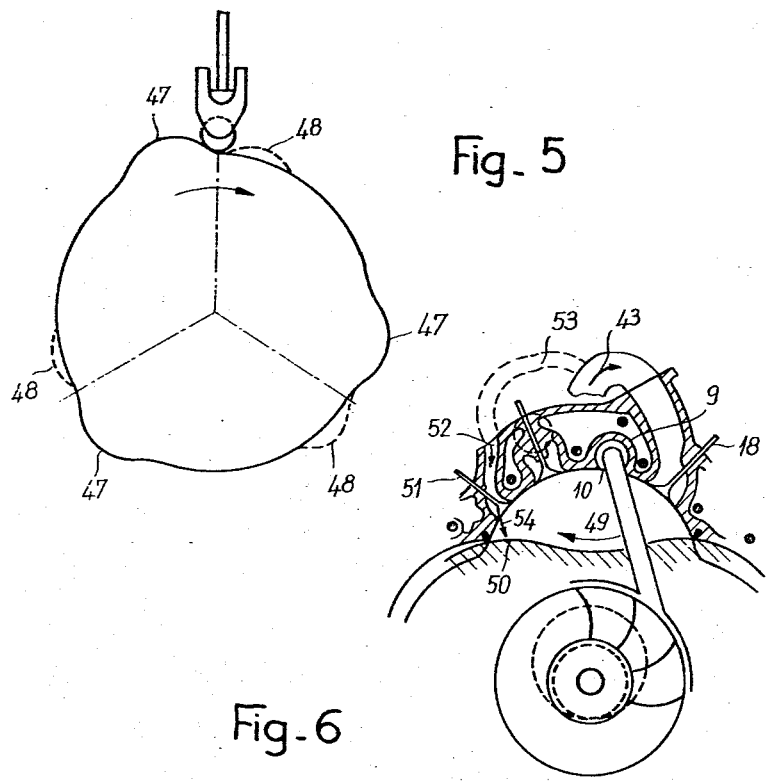

3,358,439
ROTARY DIESEL ENGINES EQUIPPED WITH A TURBO-SUPERCHARGER
Gaëtan de Coye de Castelet, Billancourt, France, assignor to Regie Nationale des Usines Renault, Billancourt, France, a French works under the control and the authority of the French Government
Filed May 21, 1965, Ser. No. 457,726
Claims priority, application France, May 30, 1964, 976,558, Patent 1,418,849
5 Claims. (Cl. 60—13)

ABSTRACT OF THE DISCLOSURE

A rotary diesel engine including a rotor having end lobes of epicycloidal contour eccentrically mounted for revolution within a stator having $n+1$ lobes forming therebetween $n+1$ working chambers within each working chamber having a combustion chamber of the same length as said rotor; turbulence produced within the cylindrical combustion chamber being the resultant of natural turbulence, induction turbulence created by properly disposed valves and scavenging turbulence, all of said turbulences being in the same direction. The engine is supercharged by means of a coaxial turbo supercharger of the exhaust blowoff type including a partial injection helical-centripetal turbine.

---

In a prior French patent application dated May 29, 1964 and entitled "Improvement in or Relating to Diesel Rotary Engines" the applicant disclosed a diesel-type rotary engine of the type comprising a rotor having $n$ lobes of epicycloidal contour revolving eccentrically in a stator having $(n+1)$ lobes constituting $(n+1)$ working chambers, this engine being provided with cylindrical combustion chambers of which the generatrices have the same length as the rotor generatrix, with inlet ducts the mesial plane of which is coincident with that of the rotor.

It is the object of the present invention to combine with an engine of the above type an exhaust gas turbo-supercharger of which the turbine is driven by means of a partial injection from another so-called "blowoff" exhaust valve disposed at an axial end of each cylindrical combustion chamber. The turbine is of the helical-centripetal type and in the case of an engine having a five-lobe stator it receives the five blowoff impulses through five equal pipes having the shortest possible length.

In fact, the advantages resulting from the use of a blowoff valve are well known; this valve permits utilizing immediately and converting into speed the 40 to 55 p.s.i.-pressure available at the end of the expansion, of exhausting and thus utilizing the two-thirds or three-fourths of the exhaust gas for propelling the turbine. In contradistinction the conventional exhaust valve, when lifted, has only a small proportion of gas to discharge without any counter-pressure in front of the piston or the member substituted therefor, in this case the rotor lobe; the power available in the turbine of the invention being so to say gratuitous.

In spite of the lower efficiency of partial-injection turbines the global balance is higher because the turbine will not retard the upward stroke of the piston or the rotor movement.

The helical-centripetal supercharger is of a conventional type, with or without a bladed diffuser, and adapted to diffuse the compressed air through five pipes leading to the five inlet ports of the aforesaid type of engine.

Disposing the blowoff valve at the axial end of the cylindrical combustion chamber constitutes a very interesting feature of this invention for, in addition to the greater convenience of disposing this additional valve in the front flange instead of in the corresponding stator portion, the burnt hot gas under pressure, or at least the greater part of this gas, must compulsorily flow again through the combustion chamber before being exhausted in the turbine, thus increasing the temperature of the combustion chamber itself. This is a particularly advantageous feature when it is contemplated to use several types of fuels and thus obtain the qualification of the engine among multi-fuel engines.

Of course, the compressed air thus produced is also advantageous for effecting a scavenging action adapted to cool those portions of the rotor surface which became particularly hot during the preceding combustion. But due to the very constructional characteristics of this engine it is scarcely possible to cross the valves at the top dead center position according to a known technique.

A first solution according to the present invention consists in slightly lifting the inlet valve during a substantial fraction of the main exhaust period, in closing this valve at the top dead center position, and re-opening it at the normal height to produce the normal induction phase.

The rotor portion firstly concerned with this scavenging air is not forcibly the hottest portion; therefore, it is a complementary object of this invention to provide a second method which consists in adding a small special blowoff valve disposed at the most suitable location of the working chamber for sweeping firstly the hottest zone of the rotor.

In order to afford a clearer understanding of this invention and of the manner in which the same may be carried out in practice, reference will now be made to the accompanying drawings showing diagrammatically by way of example a typical form of embodiment of a rotary diesel engine constructed according to the teachings of this invention. In the drawings:

FIGURE 1 is a longitudinal section taken along the crankshaft axis and also along the axis of a combustion chamber of a rotary diesel engine equipped with a turbo-supercharger;

FIGURE 2 is a superposition of the two cross-sections II—II and III—III passing the one through the mesial plane of the rotor and the other through the turbine axis;

FIGURE 3 illustrates on a larger scale a detail of FIGURE 1 in the vicinity of the combustion chamber, to show the construction of the blowoff valve and the exhaust duct associated therewith;

FIGURE 4 is a timing diagram;

FIGURE 5 is a diagram of the cam controlling the inlet valve with its scavenging boss, and FIGURE 6 illustrates a modified construction of the stator portion surrounding the working chamber equipped with its additional blowoff valve.

The rotary engine illustrated in the drawings comprises an eccentric 1 rotating in the direction of the arrow 2, a rotor 3 having four lobes of epicycloidal contour which revolves in the direction of the arrow 4, and a stator 5 having five working chambers bounded by the envelopes of the rotor contour and separated by sealing segments 6 according to the known technique. The rear flange 7 and the front flange 8 both formed with the fixed guide gears 12 are also shown, these gears consisting of internally toothed wheels meshing with pinions 14 rigid with the rotor 3, the ratio of these gears being 4:5 in the case illustrated concerning a four-lobe rotor; the assembly further comprising the combustion chambers 9 opening into the working chambers 60 through relatively large orifices 10, the inlet valves 18 and exhaust valves 19, and the exhaust pipe 20 opening to the rear of the engine. The inlet pipe 21 has its mesial plane merged into that of the rotor; the air penetrates in the direction of the arrow 22.

The inlet and exhaust valves 18, 19 are actuated by rockers such as 23, push-rods 24 and tappets 25 from cams such as 26, of which only one is shown in FIGURE 1.

In FIGURES 1 and 3 there is shown at the end of the combustion chamber 9 the blowoff valve 27 made of a metal having a very good heat resistance, this valve engaging a seat 28 of same metal which is fitted in the flange 8. This valve is actuated by a rocker 29, a push-rod 30 and a tappet 31 from a cam 32.

The pipe 33 of this blowoff valve has an extension 34 covered by a lagging 35 (FIGURE 3) and leading into the intake 36 of the turbine.

This turbine 37 is of the action type, that is, wherein the pressure is transformed completely into velocity at the outlet end of intake 36, the gas being exhausted through the orifice 38 connected in a manner not shown to the conventional exhaust ducts 20. The turbine shaft 39 drives the rotor 40 of the helical-centrifugal supercharger receiving the induction air in the casing 41 and delivering it through five pipes 42 connected at 43 to the inlet pipes 21. It will also be noted that the engine crankshaft 1 carries at its rear end a flywheel 15 and at its front end a counterweight 16. There is also shown by way of example a timing system comprising a toothed wheel 17 rigidly mounted on the eccentric 1, counter-gear 44 and a gear 45 carrying the various cams of which only two are shown. These cams revolve at one-sixth of the eccentric speed and in the same direction, and are each provided with three equally spaced lobes of same design to provide the proper cycle.

The fuel injection through injectors 13 takes place as described in the aforesaid patent application, a typical disposal being illustrated in FIGURE 3 with a starting glow plug 46.

FIGURE 4 illustrates the timing diagram, showing the inlet valve lift in thick lines, the main exhaust valve lift in dash lines and in chain-dotted lines the blowoff valve lift.

Considering a conventional cycle, the inlet valve opens at a point $a$ very close to the top dead center and remains open until point $b$ is attained, the angular lag $\alpha$ between the valve closing and the intake corresponding for example to the conventional value of 30 to 60 degrees. Then, during the compression and up to the top dead center position, all the valves are closed and remain so also during the expansion cycle from point $a$ to point $c$ forming with the bottom dead center the conventional angle $\beta$ (opening to exhaust lag). At point $c$ the blowoff valve is lifted, and the 40 to 55 p.s.i. pressure existing in the working chamber will scavenge the gas at high velocity through the duct 34.

At $d$, substantially the bottom dead center, the exhaust valve 19 is lifted; during some time both the blowoff and exhaust valves are open; then the blowoff valve recloses at $e$; between point $d$ and the top dead center the gas is expelled through the conventional exhaust valve substantially at atmospheric pressure, this valve closing again at $h$ near the top dead center. Simultaneously with the exhaust the inlet valve is slightly lifted, from point $f$ to point $g$, point $f$ being selected at the best to keep the exhaust pressure below the inlet pressure value, point $g$ being substantially coincident with or adjacent to the top dead center; the inlet valve cam is shown in FIGURE 5, the reference numeral 47 designating the conventional cam lobes corresponding to the inlet between $a$ and $b$, the dash lines 48 denoting the small lobes corresponding to the cam lifting from $f$ to $g$.

Of course, points $f$ and $e$ are determined by experience.

In the case illustrated in FIGURE 4 the toothed wheel 45 carries three cams, namely a cam 32 for the blowoff valve $ce$ and two cams 26 corresponding the one to the exhaust $dh$ and the other to the inlet as described hereinabove with reference to FIGURE 5.

Considering now FIGURE 6 it will be seen that the lifting of the inlet valve 18 during the last fraction of the exhaust produces a scavenging action in the direction of the arrow 49; now the hottest point of the rotor after the combustion and expansion cycles lies approximately in region 50; therefore, as an alternative to the arrangement of FIGURE 6, there is provided a small scavenging valve 51 fed through a duct 52 branched off the inlet pipe 43 through a pipe 53. This duct 52 is so directed as to create an air stream in the direction of the arrow 54, which is particularly adapted to cool the rotor region 50.

Under these conditions $fg$ corresponds to the lifting of this valve 51 and a fourth cam is provided on the toothed wheel 45 for actuating this cam.

It is not deemed necessary to describe in detail the turbulence and combustion conditions obtained with this arrangement, since they have been explained in detail in the aforesaid patent application. In this specific arrangement the main feature is the operation of the partial-injection turbo-supercharger providing at the same time on the one hand more power since the supercharging is attended by very satisfactory efficiency conditions: in fact, due to the provision of the blowoff valve and the atmospheric conditions in which the conventional exhaust valve operates, no counter-pressure is created by the supercharger when the rotor lobes "rise" in the working chambers; and on the other hand, an improvement in the "multi-fuel" characteristics of the engine due to the second passage of the greater part of the burnt gas through the combustion chamber when the blowoff takes place. It may be noted that both during the expansion and during the exhaust blowoff, the passage of gas through the combustion chamber, the working chamber and vice versa is not a transfer since the communication orifice 10 between these two chambers has very large dimensions and its sole purpose is to create a turbulence which is developed naturally, as explained in the above-mentioned preceding patent application, is created by the natural movement of the rotor, the direction of the induction turbulence and the scavenging action.

I claim:

1. A rotary diesel engine of the type comprising a stator having $n+1$ lobes, a drive shaft, an epicycloidal rotor having $n$ lobes and being eccentrically and rotatably mounted on said drive shaft within said stator, said rotor and said stator forming therebetween $n+1$ working chambers each having a cylindrical combustion chamber of a length equal to that of the rotor, said stator comprising an annular portion and a lateral cover on each side thereof; a coaxial turbo compressor having exhaust blowoff and an action type turbine provided with feed channels respectively connected to each of the combustion chambers, a valve at the chamber outlet end of each said channel, said valves being positioned at the end of the combustion chambers in one of said side covers, inlet and exhaust valves in each said working chamber, cam means associated with the drive shaft to operate said valves, said cam means having an auxiliary boss adjacent to and preceding the main boss to obtain a slight lifting of the intake valves during the principal portion of the exhaust phase.

2. A rotary diesel engine as described in claim 1, wherein an auxiliary valve is included to provide scavenging during a portion of the exhaust phase.

3. A rotary diesel engine of the type comprising a stator having $n+1$ lobes, a drive shaft mounted in said stator, an epicycloidal rotor having $n$ lobes mounted for eccentric revolution on said drive shaft, said rotor and stator forming therebetween $n+1$ working chambers, a cylindrical combustion chamber of the same length as said rotor for each said working chamber, a coaxial turbo supercharger of the exhaust blowoff type comprising a partial injection helical-centripetal turbine operatively connected to said engine, inlet and exhaust valves in each said working chamber, blowoff valves disposed endwise of each said cylindrical combustion chambers in the side walls of said stator, and means for operatively sequentially controlling said valves whereby three turbulences in the same direction will be created, namely, natural turbulence, induction turbulence created by the disposition of said valves and scavenging turbulence.

4. A rotary diesel engine according to claim 3 in which the scavenging effect is produced during a considerable portion of the exhaust cycle by opening an auxiliary valve, said auxiliary valve being so disposed that the corresponding air flow developed is directed towards the region of the rotor lobe which has just been intensely heated in the expansion cycle.

5. A rotary diesel engine according to claim 2 in which the scavenging effect is produced during a considerable portion of the exhaust cycle by opening said auxiliary valve, said auxiliary valve being so disposed that the corresponding air flow developed is directed towards the region of the rotor lobe which has just been intensely heated in the expansion cycle.

References Cited

UNITED STATES PATENTS

| | | |
|---|---|---|
| 2,447,292 | 8/1948 | Van Acker. |
| 3,131,678 | 5/1964 | Peras _____ 123—8 |

FOREIGN PATENTS

| | | |
|---|---|---|
| 1,297,912 | 5/1962 | France. |

RALPH D. BLAKESLEE, *Primary Examiner.*

MARK NEWMAN, *Examiner.*